US007573564B2

(12) United States Patent
Ruff et al.

(10) Patent No.: US 7,573,564 B2
(45) Date of Patent: Aug. 11, 2009

(54) SYSTEMS FOR DOPPLER TRACKING USING PHOTONIC MIXING DETECTORS

(75) Inventors: William Charles Ruff, Catonsville, MD (US); Brian C. Redman, Lafayette, CO (US); Barry Lee Stann, Edgewater, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 11/768,354

(22) Filed: Jun. 26, 2007

(65) Prior Publication Data

US 2009/0002679 A1    Jan. 1, 2009

(51) Int. Cl.
    G01C 3/08    (2006.01)
(52) U.S. Cl. .................................. 356/4.01
(58) Field of Classification Search ....... 356/3.01–3.15, 356/4.01–4.1, 5.01–5.15, 6–22
    See application file for complete search history.

(56) References Cited

U.S. PATENT DOCUMENTS

| 4,913,547 | A | * | 4/1990 | Moran ......................... 356/489 |
| 5,608,514 | A | | 3/1997 | Stann et al. |
| 5,621,514 | A | | 4/1997 | Paranto et al. |
| 5,835,199 | A | | 11/1998 | Phillips |
| 5,847,816 | A | | 12/1998 | Zediker et al. |
| 5,877,851 | A | | 3/1999 | Stann et al. |
| 6,559,932 | B1 | | 5/2003 | Halmos |
| 6,844,924 | B2 | | 1/2005 | Ruff et al. |
| 2002/0048012 | A1 | | 4/2002 | Stann |
| 2003/0076485 | A1 | | 4/2003 | Ruff et al. |
| 2004/0100626 | A1 | * | 5/2004 | Gulden et al. ............... 356/28.5 |
| 2004/0227661 | A1 | * | 11/2004 | Godsy ......................... 342/70 |
| 2005/0195383 | A1 | * | 9/2005 | Breed et al. ................. 356/4.01 |
| 2005/0225776 | A1 | * | 10/2005 | Gulden et al. ............... 356/601 |

OTHER PUBLICATIONS

Barry L. Stann et al., "Intensity-modulated diode laser radar using frequency-modulation/continuous-wave ranging techniques," Optical Engineering, 35(11) 3270-78 (Nov. 1996).
William Ruff et al., "Self-mixing detector candidates for an FM/cw ladar architecture," Proc. SPIE vol. 4035, p. 152-162 (Sep. 2000).
William C. Lindsey and Chak Ming Chie, "A Survey of Digital Phase-Locked Loops," Proc. IEEE, vol. 69, No. 4, pp. 410-31 (Apr. 1981).

* cited by examiner

*Primary Examiner*—Thomas H Tarcza
*Assistant Examiner*—Luke D Ratcliffe
(74) *Attorney, Agent, or Firm*—A. David Spevack

(57) ABSTRACT

Ladar systems are provided. An exemplary ladar system includes a waveform generator for generating an arbitrary waveform, a laser for transmitting a modulated light signal toward a target, and a Doppler tracking loop for tracking the Doppler frequency shift between the transmitted light signal and a received reflected light signal.

5 Claims, 7 Drawing Sheets

SYSTEMS FOR DOPPLER TRACKING USING PHOTONIC MIXING DETECTORS

GOVERNMENT INTEREST

The invention described herein may he manufactured, used, and licensed by or for the United States Government.

CROSS-REFERENCE TO RELATED APPLICATIONS

This application is related to U.S. patent application Ser. No. 10/183,536, filed Jun. 28, 2002, now U.S. Pat. No. 6,844,924 issued Jan. 18, 2005.

TECHNICAL FIELD

The invention generally relates to laser detection and ranging.

DESCRIPTION OF THE RELATED ART

For a typical optical heterodyne receiver, the return signal and the optical local oscillator signal are both directed onto an optical detector. Both signals are optically mixed with each other and the phase and frequency difference between the optical signals, as well as that of any modulation waveform applied to the optical signals, is converted from an optical to electrical signal by the optical detector. The optical fields can be represented simply as, $$E(t)_{signal} = A_{signal} \cos(\omega_{signal} t + \phi_{signal}), E(t)_{LO} = A_{LO} \cos(\omega_{LO} t) \quad (1)$$

where we have associated all of the phase difference between the signals with the return signal and we have assumed constant, un-modulated return and local oscillator signals. The detector current produced from the applied fields is $$i(t) \propto A_{signal}^2 + A_{LO}^2 + 2A_{signal} A_{LO} \cos(\omega_{signal} - \omega_{LO}|t + \phi_{signal}) \quad (2)$$

The frequency difference between the two optical signals can be due to a number of sources present both external and internal to the sensor, but for this discussion, we will assume it is due solely to the translational Doppler shift along the sensor line of sight imposed by the target of interest. At this point, the electrical current generated by the detector can be amplified and further processed to extract the Doppler frequency; however, the Doppler frequency involved can be quite high. For example, the Doppler shift of a 1 μm wavelength optical signal by a target traveling at 100 m/s is 200 MHz, requiring amplifiers of equal or higher bandwidth for the measurement. While such high bandwidth amplifiers exist, it is not always advantageous to use them due to their inherently higher noise properties. In addition, it is more expensive and more difficult to design and manufacture focal plane arrays and their readout integrated circuits with such high bandwidths compared to lower bandwidth arrays.

Other architectures have been devised to lower the frequency difference between the return and local oscillator signals and, thus, lower the required bandwidth of the detector and following amplifiers. One of the most widely used techniques is to change the optical frequency of either of the optical signals by an amount equal or close to the Doppler frequency using an acousto-optic modulator. This technique requires prior knowledge of the expected Doppler frequency or some means of measuring the Doppler frequency before the optical shift is applied. Also, when the optical shift is applied to the entire optical signal, the frequency difference is adjusted for an entire array of imaging detectors without the ability to address each detector independently. Additional architectures have been devised which provide an individual local oscillator signal and acousto-optic modulator for each detector element in an array, but this adds a lot of additional complexity to the system, and can become cumbersome, and expensive to implement for reasonable size arrays.

SUMMARY

Various systems for laser detection and ranging (LADAR) are provided An embodiment of a laser detection and ranging (LADAR) system comprises: a waveform generator for generating an arbitrary waveform; a laser for transmitting a light signal toward a target; and a Doppler tracking loop, wherein the Doppler tracking loop comprises a phase lock loop with a photonic mixing detector.

Another embodiment is an optically coherent Doppler tracking loop for a laser detection and ranging (LADAR) system, comprising: a photonic mixing detector driven by an arbitrary waveform, wherein the arbitrary waveform is further configured to modulate a light signal transmitted toward a target, wherein the photonic mixing detector is configured to receive a reflected light signal from the target, wherein the photonic mixing detector is further configured to mix the reflected light signal and the arbitrary waveform to generate a Doppler signal corresponding to a Doppler frequency, wherein the Doppler frequency corresponds to the range of the target; an amplifier, wherein the amplifier is configured to receive the Doppler signal, wherein the amplifier is further configured to transmit an amplified Doppler signal; and a voltage controlled oscillator.

A further embodiment is a ladar system comprising: means for generating an arbitrary waveform; means for transmitting a light signal toward a target, the light signal being modulated by the arbitrary waveform; means for receiving a reflected light signal, the reflected light signal corresponding to the modulated signal being reflected from the target; and means for tracking a Doppler frequency shift, wherein the means for tracking the Doppler frequency shift comprises a photonic mixing detector.

DETAILED DESCRIPTION

Figure 1:
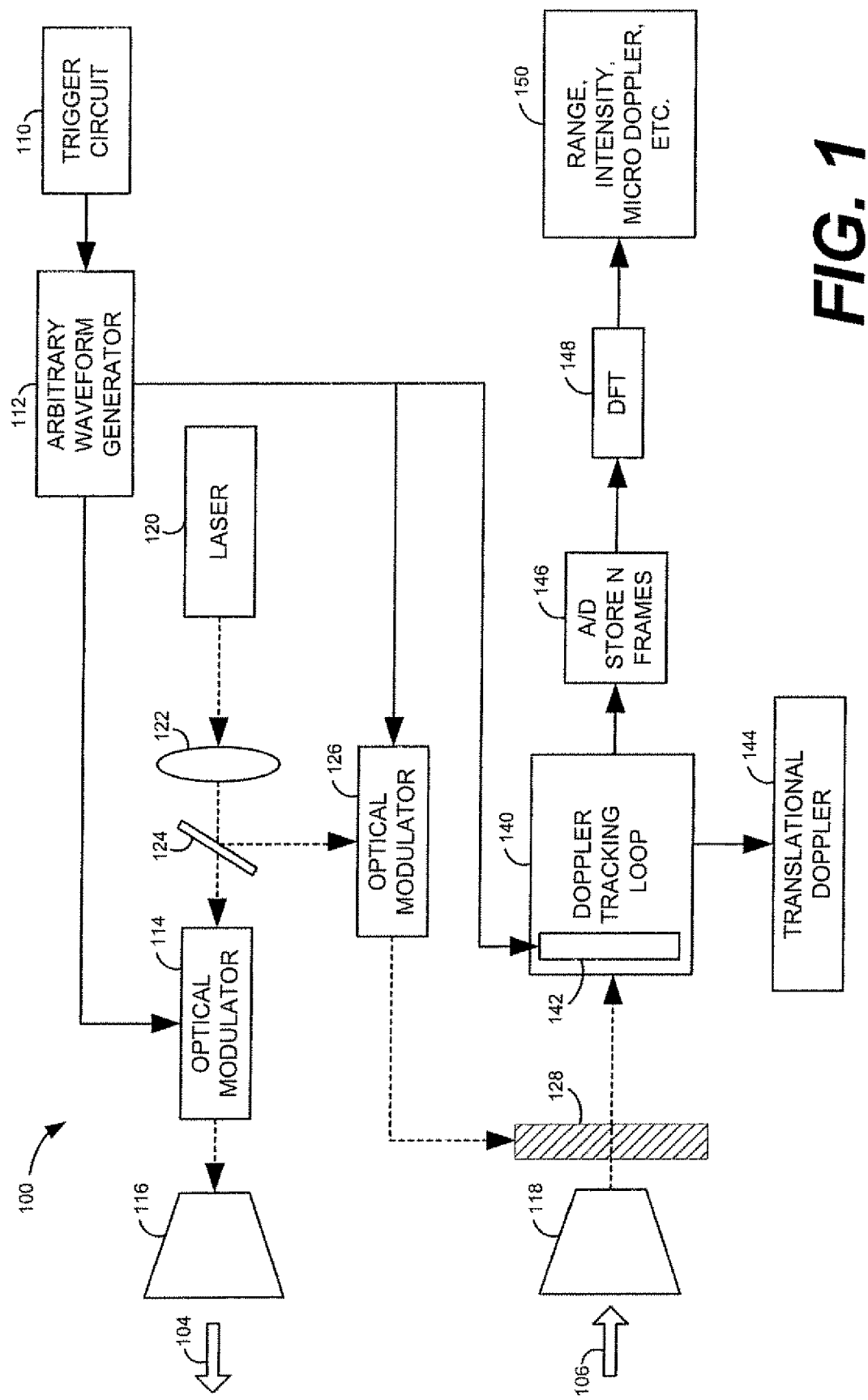
FIG. 1 is a block diagram of an embodiment of a laser detection and ranging (LADAR) system.

This disclosure relates to various embodiments of laser detection and ranging (LADAR) systems. Several embodiments are described below with reference to FIGS. 1-8. As an introductory matter, however, the basic architecture, operation, and functionality of an exemplary, non-limiting embodiment of a LADAR system will be briefly described. In general, the LADAR system operates by modulating a light signal with a known waveform and transmitting the modulated light signal toward a target. A portion of the transmitted laser intensity may be reflected from the target back toward the LADAR system and received by a sensor. The received light signal, which contains the original transmitted laser modulation, is delayed in time because of the long travel path from the transmitter to the target and back to the receiver and the optical carrier and modulation signal is shifted by the target velocity due to the Doppler Effect.

The LADAR system images the target by detecting various types of data (e.g., distance, amplitude, etc.) from the received light signal. As mentioned above, the received light signal reflected from the target is a temporally-modulated version of the transmitted signal. In order to extract ranging and velocity information from the received light signal, the LADAR system determines an intermediate frequency (IF) waveform (i.e., offset frequency). As known in the art, the intermediate frequency is a lower frequency than either the transmitted or received carrier frequency (often the difference between the transmitted and received carrier frequencies) to which the frequency of the signal is shifted as an intermediate step in transmission/reception.

The LADAR system determines the intermediate frequency by mixing the temporally-modulated received light signal with the modulation from the original transmitted light signal. As mentioned above, the transmitted light signal is modulated with a known waveform. For example, the power and/or the frequency of the transmitted light signal may be modulated with a sinusoidal waveform having a frequency that is linearly swept over a wide bandwidth. Therefore, the returned laser intensity and/or frequency at the receiver follows this modulation. In order to detect the intermediate frequency (due to the round-trip delay time between the LADAR system and the target velocity) between the modulation of the received signal and the waveform used to modulate the transmitted signal, the two signals are mixed together.

In the above example, the mixing of the transmitted modulation waveform with the received signal (which carries the transmitted modulation waveform and Doppler shift due to target motion) produces a sinusoidal modulation at the intermediate frequency between the two signals. The electrical current generated by the detector can then be amplified and further processed to extract the Doppler frequency. However, the Doppler frequency can be quite high. For example, the Doppler shift of a 1 μm wavelength optical signal for a target traveling at 100 m/s is 200 MHz, requiring amplifiers of equal or higher bandwidth for the measurement.

Other architectures have been devised to lower the frequency difference between the return and local oscillator signals and, thus lower the requisite bandwidth of the detector and the following amplifiers. One widely used technique is to change the frequency of one of the optical signals by an amount equal or close to the Doppler frequency using an acousto-optic modulator. However, this technique requires some prior knowledge of the expected Doppler frequency before the optical shift is applied. Additionally, when the optical shift is applied to the entire optical signal, the frequency difference is adjusted for the entire array of detectors eliminating the ability to address each detector independently. As an alternative, in order to minimize the bandwidth of the intermediate frequency filter, and thus improve the carrier-to-noise ratio in the receiver, the translational Doppler shift is tracked in a phase lock loop using photonic mixing detectors in a combined detecting and mixing function.

FIG. 1 is a block diagram of an embodiment of a LADAR system 100. As illustrated in FIG. 1, LADAR system 100 transmits a light signal toward a target (arrow 104) and receives a portion of the light signal reflected from the target (arrow 106). In general, LADAR system 100 comprises a waveform generator 112, a laser 120, transmission optics 116, reception optics 118, and a photonic mixing detector 142 in a Doppler tracking loop 140. The waveform generator 112 produces a signal to be used by an optical modulator 114 for laser modulation and the local oscillator signal for photonic mixing detector 142.

A local oscillator signal can be generated as an optical signal, where the waveform generator signal is supplied to a local optical modulator 126. The local optical modulator modulates a portion of light from the laser 120 for transmission to an optical mixing element 128. In an alternative, the waveform signal is supplied as an electrical signal and mixed with the received signal at the photonic mixing detector 142. It will be appreciated that the waveform signal may be modified for transmission to the photonic mixing detector 142.

For example, in some embodiments, the signal generated by the waveform is provided to a wideband RF power amplifier (not shown). The amplified signal is provided to the optical modulator 114 or directly to the laser 120. Where the laser output is directly modulated, the LADAR system 100 may include a matching circuit (not shown) that matches die driving impedance of amplifier to the impedance of laser 120.

The modulated light waveform is collected by transmission optics 116, collimated, and directed toward a target (arrow 104). The portion of transmitted light that is reflected by the target and propagated back (arrow 106) to LADAR system 100 is collected by reception optics 118 and focused onto the active detection region of photonic mixing detector 142. As discussed above, in some embodiments the reflected light is combined with a local oscillator signal optically using an optical mixing element 128 or electrically in the photonic mixing detector 142.

Referring to the embodiment in FIG. 1, photonic mixing detector 142 converts the collected incident light into a current waveform having an amplitude proportional to the power of the received light. In this manner, the photonic mixing detector 142 generates a current waveform identical, in the case of an optically mixed system, to the original modulating waveform combined with the temporally shifted waveform.

Figure 2:
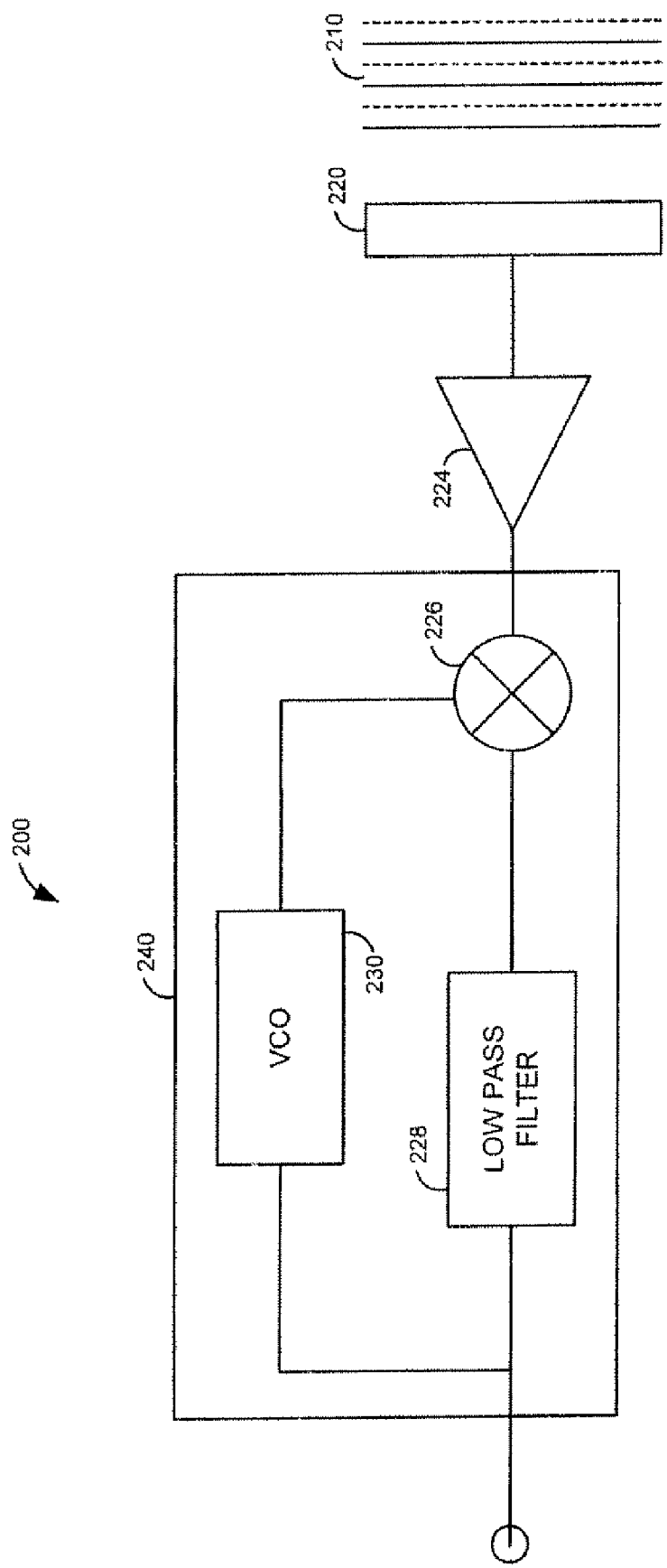
FIG. 2 is a block diagram illustrating a Doppler tracking loop as found in the prior art.

The typical optical heterodyne receiver, as illustrated in FIG. 2, has an optical detector 220 for receiving the optical local oscillator and return signals 210. The local oscillator and the return signals 210 are optically mixed with each other and the phase and frequency difference between the optical signals is converted from an optical signal to an electrical signal by the optical detector 220. The resulting detector current can be expressed as:

$$i(t) \propto A_{signal}^2 + A_{LO}^2 2A_{signal}A_{LO}\cos(\omega_{signal}-\omega_{LO}|t+\theta_{signal})$$

The detector current is provided to an amplifier 224, which converts the detector current into a voltage waveform for processing in a phase lock loop 240. The phase lock loop 240 includes, for example, an element for mixing 226, a low-pass filter 228 and a voltage controlled oscillator 230. One of ordinary skill in the art should understand that amplifier 224 may comprise any of a number of different types of amplifiers. For example, the amplifier 224 may comprise a wideband, trans-impedance amplifier. The amplified voltage waveform may be provided to a low-pass filter 228 to recover the intermediate frequency (IF) signal. Referring back to FIG. 1, the intermediate frequency (IF) signal may be converted into digital form via an A/D converter which will store N frames 146. The data may be further processed through a discrete Fourier transform 148 to extract the range, intensity, Doppler, micro-Doppler and other relevant data 150. In this regard, LADAR system 100 may further comprise memory 158 which contains various hardware, firmware, software, etc. for controlling the processing of the intermediate frequency (IF). One of ordinary skill in the art should understand that the output waveform of photonic mixing detector 142 and the Doppler tracking loop 140 may be processed in a variety of ways. Therefore, in alternative embodiments of LADAR system 100, additional components may be present. Furthermore, some components illustrated in FIG. 1 may be substituted for others and/or removed from LADAR system 100.

Having described the general components of LADAR system 100, the operation and/or control of Doppler tracking loop 140 will be described in more detail. As mentioned above, LADAR system 100 determines the intermediate frequency by mixing the temporally-modulated return signal light (arrow 106) with the original transmitted light signal (arrow 104). The light signal transmitted by laser 120 is modulated with the waveform produced by waveform generator 112. The return signal light at reception optics 118, therefore, follows this modulation. In order to detect the intermediate frequency (due to the round-trip delay time between the LADAR system and the target velocity) between the modulation of the return signal light and the waveform used to modulate the transmitted signal, the two signals are mixed together.

Figures 3, 4:
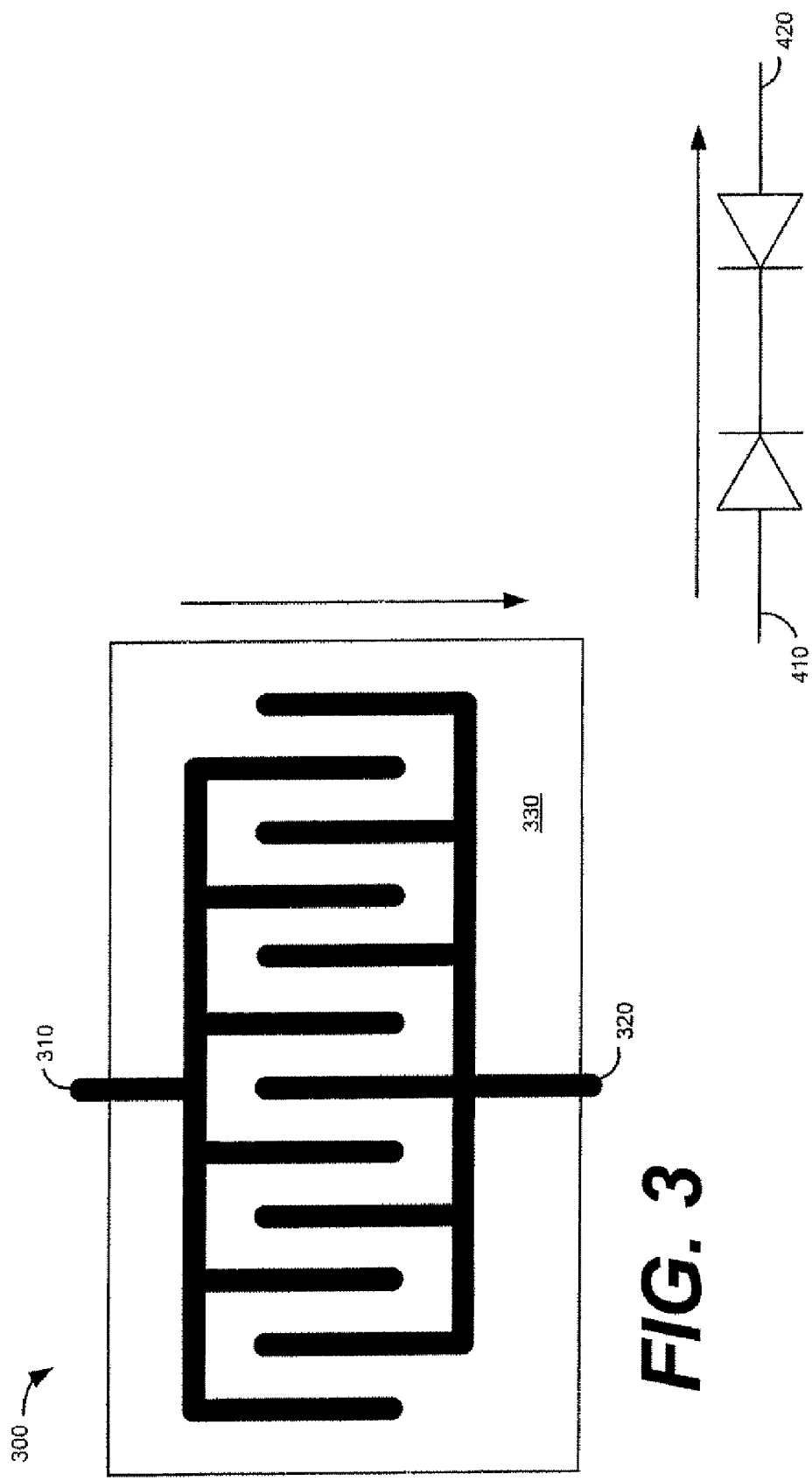
FIG. 3 is a diagram illustrating an embodiment of a metal-semiconductor-metal photonic mixing detector.
FIG. 4 is a schematic diagram of the electrical component equivalent of a metal-semiconductor-metal detector.

Reference is now made to FIG. 3, a diagram of a metal-semiconductor-metal (MSM) mixing detector 300 of the present embodiment. The MSM detector is a photodiode formed by an interdigitated electrode configuration 310, 320 on top of an active light collection region 330. The MSM detector functions as a back-to-back Schottky diode arrangement as shown in FIG. 4 wherein the MSM electrodes 310, 320 correspond to circuit equivalent electrodes 410, 420.

Figure 5:
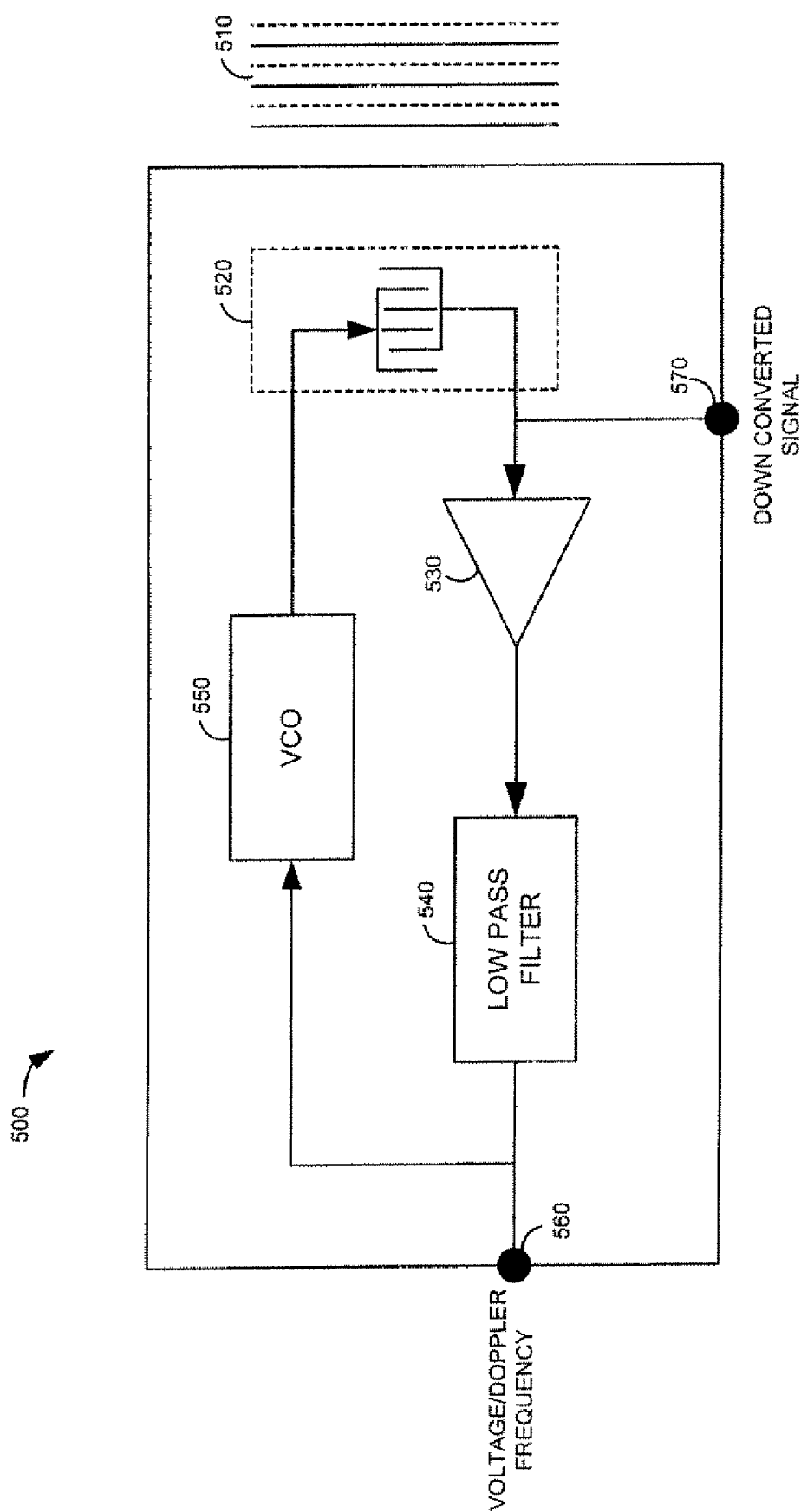
FIG. 5 is a block diagram of another embodiment of a Doppler tracking loop utilizing a photonic mixing detector in an optically mixed system.

A block diagram of an embodiment of the Doppler tracking loop is illustrated in FIG. 5. As shown in FIG. 5, this embodiment of the Doppler tracking system with photonic mixing detectors is implemented in an optically coherent detection system. The photonic mixing detector 520 receives the optically mixed local oscillator and return signals 510. The phase and frequency difference between the optical signals is converted from an optical signal to an electrical signal by the photonic mixing detector 520 and opto-electrically mixed to a lower frequency signal. The resulting signal is a modulation of the temporal density of signal current at the difference frequency (i.e., intermediate frequency (IF)) between the mixed local oscillator and the return signal. Thus, the detector current reflects a down-converted signal 570 of the phase lock loop. Since the detector signal reflects the opto-electrical mixing with the feedback in the phase lock loop, it oscillates at the lower intermediate frequency signal and requires a much lower bandwidth amplifier 530 than the prior art FIG. 2 high bandwidth amplifier 224.

Generation of the intermediate frequency signal at the photonic mixing detector 520 reduces the required bandwidth of the amplifier and enables tracking of the Doppler frequency at the detector. One of ordinary skill in the art should understand that since the detector can be one of many detectors in a focal plane array, the Doppler tracking of this embodiment can be performed at the focal plane array.

Figure 6:
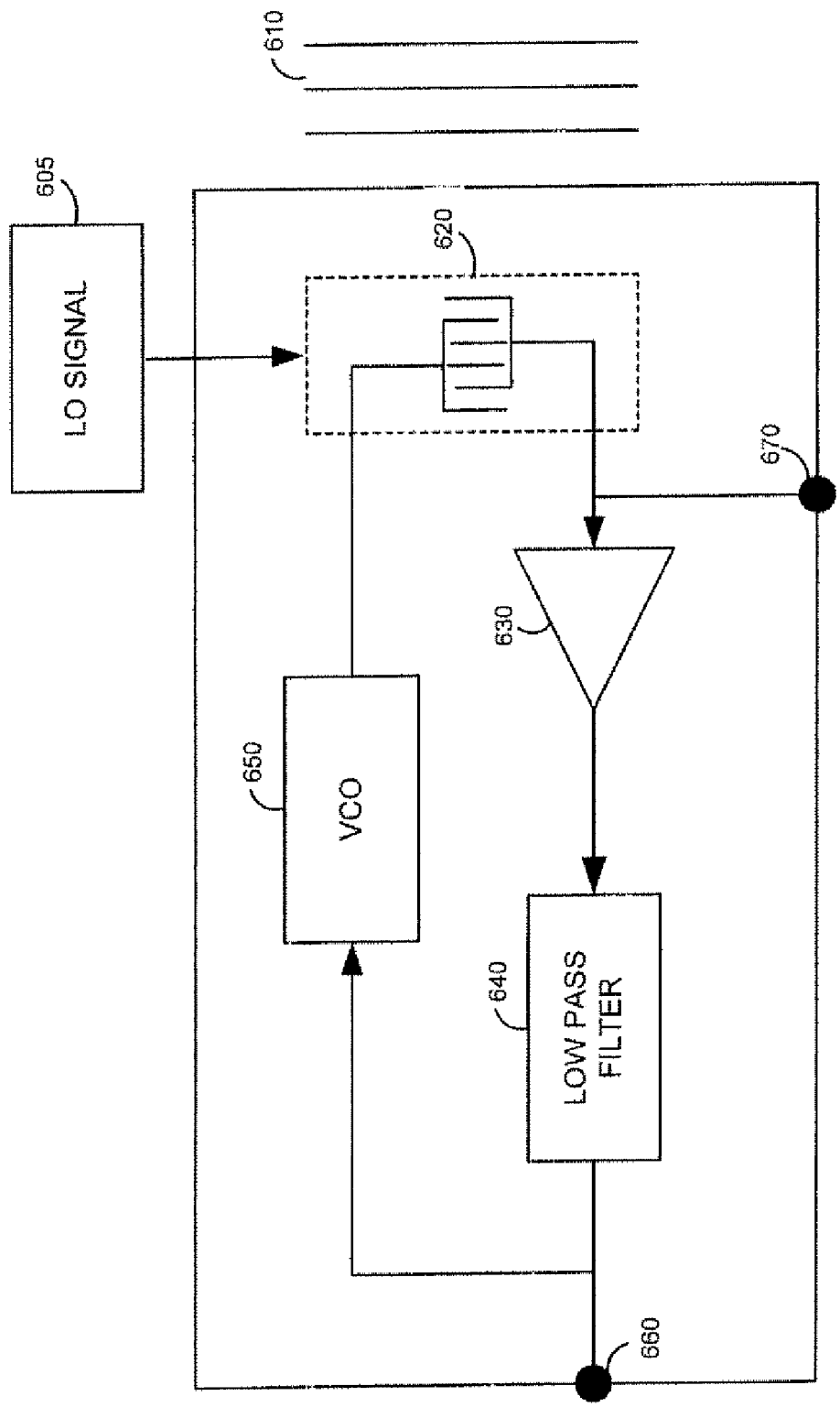
FIG. 6 is a block diagram of another embodiment of a Doppler tracking loop utilizing a photonic mixing detector in a direct detection system.

Reference is now made to FIG. 6, a block diagram illustrating some embodiments of a Doppler tracking system with photonic mixing detectors implemented in a direct detection system. The photonic mixing detector 620 receives the optical return signal 610 and the electrical local oscillator signal 605. The phase and frequency difference between the optical and electrical signals is converted to an electrical signal through opto-electrical mixing in the detector. The opto-electrical mixing also includes a lower frequency signal generated in the phase lock loop. Thus, as in the previous embodiment, the detector current reflects a down-converted signal 670 of the phase lock loop. Since the detector signal reflects the opto-electrical mixing with the feedback in the phase lock loop, intermediate frequency signal is generated before amplification.

Tracking the Doppler frequency in a pre-amplification stage reduces the required bandwidth of the amplifier and consequently increases the signal-to-noise-ratio in the receiver. One of ordinary skill in the art should understand that since the detector can be one of many detectors in a focal plane array, the Doppler tracking of this embodiment can be performed at the focal plane array. Further, since the detection and mixing functions may be performed within the detector, these functions are performed at the focal plane array.

Figure 7:
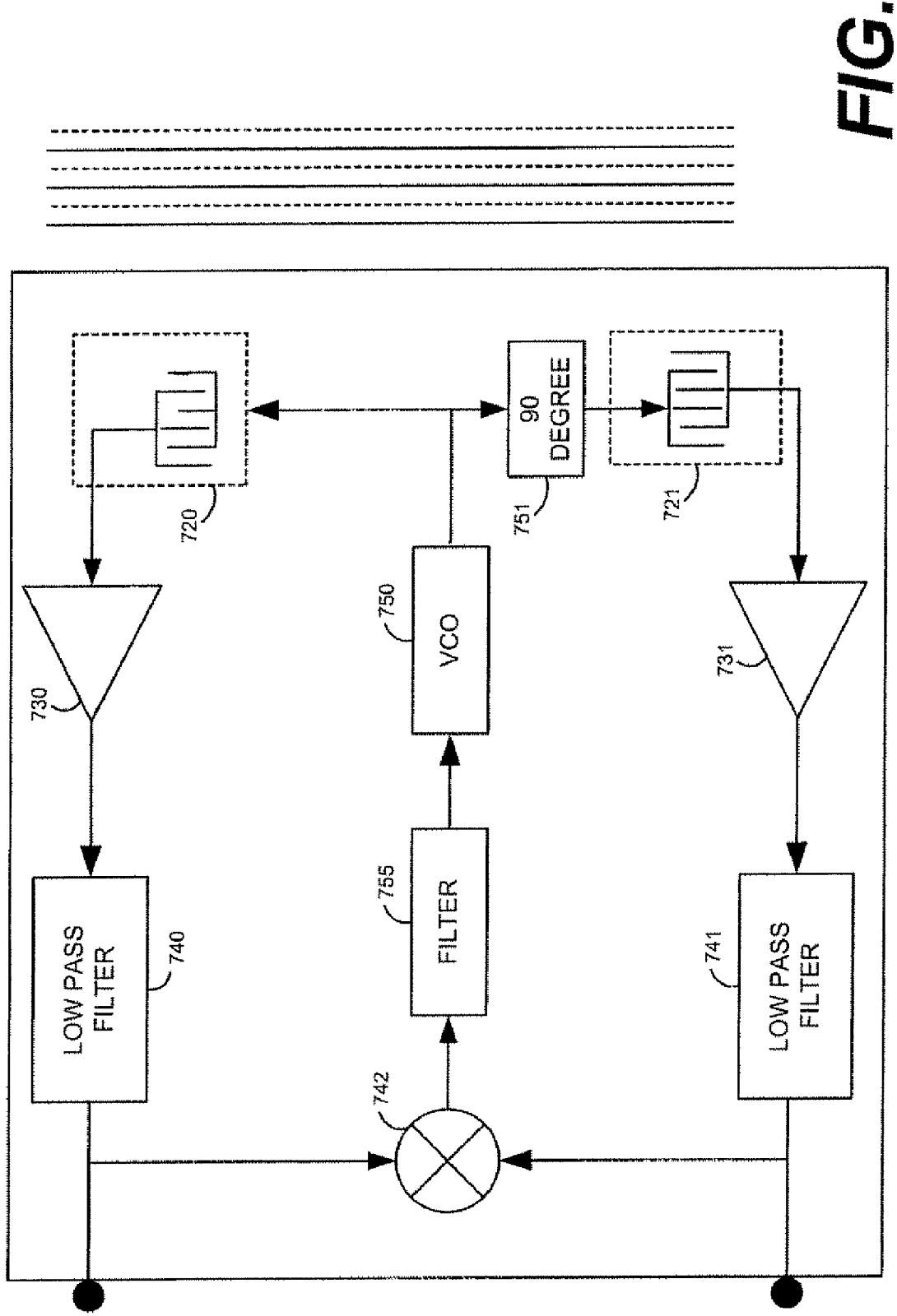
FIG. 7 is a block diagram of another embodiment of a Doppler tracking loop utilizing a pair of photonic mixing detectors in a bi-phase modulated system.

The block diagram of FIG. 7 illustrates an embodiment where the photonic mixing detectors 720, 721 can be used to track the Doppler shift in an optically coherent system when the optical signals are, for example, bi-phase modulated. This embodiment utilizes one photonic mixing detector 720 for the in-phase channel and one photonic mixing detector 721 for the quadrature phase channel. Note that the feedback signal generated from the voltage controlled oscillator 750 is shifted ninety degrees 751 for the quadrature detector 721.

Figure 8:
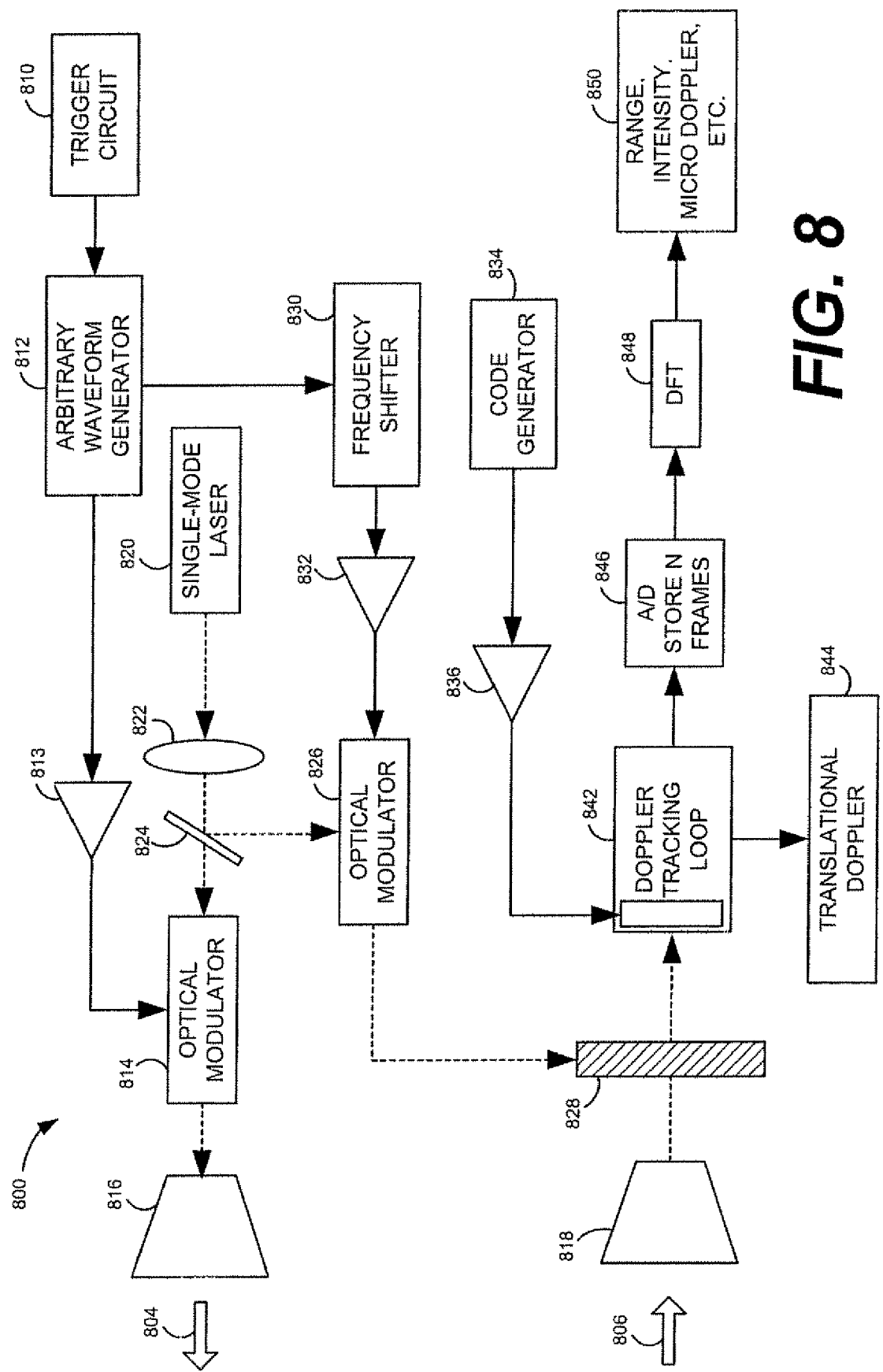
FIG. 8 is a block diagram of another embodiment of a laser detection and ranging (LADAR) system.

FIG. 8 illustrates an alternative embodiment of a LADAR system 800. LADAR system 800 may be configured in much the same manner as LADAR system 100. As illustrated in FIG. 8, LADAR system 800 further comprises a high-gain amplifier 813 to provide impedance matching between the waveform generator 812 and the optical modulator 814 used to generate the transmitted optical signals 804. Further, some embodiments of the system includes a frequency shifter 830 for establishing multiple communications channels simultaneously. An impedance matching amplifier 832 is optionally provided with the frequency shifter 830.

Further, the LADAR system 800 incorporates a code generator 834 coupled to the photonic mixing detector 842 through an impedance matching amplifier 836. The code generator supports functionality including, for example, code multiplexing at the focal point array in conjunction with a scheme such as code division multiple access (CDMA) readout.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments are merely possible examples of implementations. Many variations and modifications may be made to the above-described embodiments. All such modifications and variations are intended to be included herein within the scope of this disclosure and protected by the following claims.

What is claimed is:

1. A laser detection and ranging (LADAR) system comprising:
   a waveform generator for generating an arbitrary waveform;
   a laser for transmitting a light signal toward a target, wherein a first optical modulator receives the arbitrary waveform;
   wherein the first optical modulator generates a modulated light signal;
   a second optical modulator generates a second modulated light signal that is fed into an optical coupling element to recover a light signal modulated by a Doppler frequency related to the wavelength of light; and
   a Doppler tracking loop, wherein the Doppler tracking loop comprises a phase lock loop;
   wherein the phase lock loop comprises a photonic mixing detector, wherein the photonic mixing detector is configured to receive said reflected Doppler modulated light signal;
   wherein the photonic mixing detector is further configured to receive a signal from the waveform generator, the photonic mixing detector comprises a metal-semiconductor-metal configuration;
   the Doppler tracking loop further comprises a first amplifier, wherein the first amplifier receives a signal from the photonic mixing detector, the Doppler tracking loop further comprises a low-pass filter, wherein the low-pass filter receives the amplified signal from the first amplifier, and
   wherein the Doppler tracking loop further comprises a voltage-controlled oscillator (VCO) with operating frequency commensurate with the expected range of Doppler frequencies related to the wavelength of light, wherein the voltage-controlled oscillator is configured to receive a signal from the low-pass filter, and wherein the voltage-controlled oscillator is further configured to transmit an output signal to the photonic mixing detector.

2. The laser detection and ranging (LADAR) system of claim 1, wherein the photonic mixing detector receives the signal from the waveform generator (LO signal) as an electrical signal.

3. The laser detection and ranging (LADAR) system of claim 1, further comprising a second optical modulator, wherein the second optical modulator receives the arbitrary waveform, and modulates the light signal, wherein the modulated light signal from the second optical modulator is transmitted to an optical coupling element, wherein the photonic mixing detector receives the signal from the waveform generator as an optical signal from the optical coupling element.

4. A LADAR system comprising:
   a waveform generator;
   a light source;
   a first amplifier for amplifying a waveform from the waveform generator;
   a first optical modulator driven by the first amplifier, wherein optical signals generated by the light source are transmitted to a target;
   a second optical modulator generates a second modulated light signal that is fed into an optical coupling element to recover a light signal modulated by a Doppler frequency related to the wavelength of light; the optical signals are bi-phase modulated, the Doppler tracking loop further comprises:
   a first photonic mixing detector configured to detect an in-phase portion of the optical signals; and
   a second photonic mixing detector configured to detect a quadrature phase of the optical signals, wherein the Doppler tracking loop further comprises:
   a first photonic mixing detector configured to detect an in-phase portion of the optical signals; and
   a second photonic mixing detector configured to detect a quadrature phase of the optical signals, wherein the Doppler tracking loop further comprises:
   a second amplifier configured to amplify the output from the first photonic mixing detector; and
   a third amplifier configured to amplify the output from the second photonic mixing detector and
   a Doppler tracking loop comprising a plurality of photonic mixing detectors, the Doppler tracking loop being operative to track the Doppler frequency, wherein the Doppler tracking loop further comprises:
   a first low-pass filter for filtering the amplified first photonic mixing detector output to generate a first filtered signal;
   a second low-pass filter for filtering the amplified second photonic mixing detector output to generate a second filtered signal; and
   a mixer for combining the first filtered signal and the second filtered signal to generate a combined signal.

5. The LADAR system of claim 4, wherein the Doppler tracking loop further comprises:
   a voltage controlled oscillator configured to receive the combined signal and to transmit a frequency signal to the first photonic mixing detector; and
   a phase shifting element for receiving the frequency signal, wherein the phase shifting element transmits a quadrature-phase frequency signal to the second photonic mixing detector.

* * * * *